US011885903B2

(12) United States Patent
Meissner et al.

(10) Patent No.: US 11,885,903 B2
(45) Date of Patent: Jan. 30, 2024

(54) FMCW RADAR WITH INTERFERENCE SIGNAL SUPPRESSION USING ARTIFICIAL NEURAL NETWORK

(71) Applicant: Infineon Technologies AG, Neubiberg (DE)

(72) Inventors: Paul Meissner, Feldkirchen bei Graz (AT); Elmar Messner, Graz (AT); Franz Pernkopf, Graz (AT); Johanna Rock, Graz (AT); Mate Andras Toth, Graz (AT)

(73) Assignee: Infineon Technologies AG, Neubiberg (DE)

( * ) Notice: Subject to any disclaimer, the term of this patent is extended or adjusted under 35 U.S.C. 154(b) by 391 days.

(21) Appl. No.: 16/817,385

(22) Filed: Mar. 12, 2020

(65) Prior Publication Data
US 2020/0292660 A1 Sep. 17, 2020

(30) Foreign Application Priority Data
Mar. 14, 2019 (DE) .................. 102019106529.1

(51) Int. Cl.
*G01S 7/02* (2006.01)
*G01S 7/41* (2006.01)
(Continued)

(52) U.S. Cl.
CPC .............. *G01S 7/023* (2013.01); *G01S 7/354* (2013.01); *G01S 7/417* (2013.01); *G01S 7/356* (2021.05);
(Continued)

(58) Field of Classification Search
CPC .......... G01S 7/023; G01S 7/354; G01S 7/417; G01S 7/356; G01S 13/343; G01S 13/931; G01S 7/36; G06N 3/0454; G06N 3/08
See application file for complete search history.

(56) References Cited

U.S. PATENT DOCUMENTS 5,345,539 A    9/1994 Webb
10,879,946 B1 * 12/2020 Shima .................... G06F 17/14
(Continued)

FOREIGN PATENT DOCUMENTS

CN    109460815 A    3/2019
DE    102009047012 A1   5/2011
(Continued)

OTHER PUBLICATIONS

Ioffe et al., "Batch Normalization: Accelerating Deep Network Training by Reducing Internal Covariate Shift," arXiv: 1502.03167v3 [cs.LG], Mar. 2, 2015, 11 pages.
(Continued)

*Primary Examiner* — Timothy A Brainard
*Assistant Examiner* — Ismaaeel A. Siddiquee
(74) *Attorney, Agent, or Firm* — Harrity & Harrity, LLP

(57) ABSTRACT

A method for a radar device is described below. According to an example implementation, the method comprises transmitting an RF transmission signal that comprises a plurality of frequency-modulated chirps, and receiving an RF radar signal and generating a dataset containing in each case a particular number of digital values based on the received RF radar signal. A dataset may in this case be associated with a chirp or a sequence of successive chirps. The method furthermore comprises filtering the dataset by way of a neural network to which the dataset is fed in order to reduce an interfering signal contained therein. A convolutional neural network is used as the neural network.

20 Claims, 8 Drawing Sheets

(51) Int. Cl.
    *G01S 7/35*     (2006.01)
    *G06N 3/045*     (2023.01)
    *G01S 13/931*     (2020.01)
    *G01S 7/36*     (2006.01)
    *G06N 3/08*     (2023.01)
    *G01S 13/34*     (2006.01)

(52) U.S. Cl.
    CPC ............... *G01S 7/36* (2013.01); *G01S 13/343* (2013.01); *G01S 13/931* (2013.01); *G06N 3/045* (2023.01); *G06N 3/08* (2013.01)

(56) References Cited

U.S. PATENT DOCUMENTS

| | | | |
|---|---|---|---|
| 2010/0184395 | A1 | 7/2010 | Bagge et al. |
| 2016/0132768 | A1* | 5/2016 | Ray .................... G06N 3/08 706/22 |
| 2016/0223651 | A1 | 8/2016 | Kamo et al. |
| 2017/0180160 | A1 | 6/2017 | Moorti et al. |
| 2018/0149730 | A1* | 5/2018 | Li .................... G01S 7/0234 |
| 2018/0260702 | A1 | 9/2018 | Yamamoto et al. |
| 2018/0348343 | A1 | 12/2018 | Achour et al. |
| 2018/0348365 | A1 | 12/2018 | Achour et al. |
| 2019/0066713 | A1 | 2/2019 | Mesgarani et al. |
| 2019/0122105 | A1 | 4/2019 | Boybat et al. |
| 2019/0279366 | A1* | 9/2019 | Sick ..................... G01S 13/931 |
| 2019/0347550 | A1 | 11/2019 | Jung et al. |
| 2020/0012926 | A1 | 1/2020 | Murata |
| 2020/0042873 | A1 | 2/2020 | Daval et al. |
| 2020/0285954 | A1 | 9/2020 | Li et al. |
| 2020/0293863 | A1 | 9/2020 | Gatot et al. |
| 2020/0342315 | A1 | 10/2020 | Achterhold et al. |
| 2021/0224640 | A1 | 7/2021 | Nakahara |
| 2021/0318853 | A1 | 10/2021 | Morie et al. |
| 2022/0366253 | A1 | 11/2022 | Ozcan et al. |

FOREIGN PATENT DOCUMENTS

| | | | | |
|---|---|---|---|---|
| DE | 102017007961 A1 | | 1/2018 | |
| KR | 102137825 B1 | * | 6/2018 | |
| KR | 102137825 B1 | * | 7/2020 | ............. G01S 7/417 |
| WO | 2018/183546 A1 | | 10/2018 | |

OTHER PUBLICATIONS

Brooks D., et al., "Complex-valued Neural Networks for Fully-temporal Micro-doppler Classification," 2019 20th International Radar Symposium (IRS), Jun. 2019, 10 pages.

Gorday P., et al., "Complex-Valued Neural Networks for Noncoherent Demodulation," Dec. 18, 2019, 9 pages.

Hubara et al., "Binarized Neural Networks," 30th Conference on Neural Information Processing Systems {NIPS 2016), Spain, 9 pages.

Roth W., et al., "Training Discrete-Valued Neural Networks with Sign Activations Using Weight Distributions," Discrete-Valued Neural Networks Using Weight Distributions, In European Conference on Machine Learning {ECML), Published 2019, 17 pages.

Weichong N., et al., "Range-Doppler Detection in Automotive Radar with Deep Learning," 2020 International Joint Conference on Neural Networks (IJCNN), Jul. 2020, 8 pages.

\* cited by examiner

FMCW RADAR WITH INTERFERENCE SIGNAL SUPPRESSION USING ARTIFICIAL NEURAL NETWORK

CROSS REFERENCE TO RELATED APPLICATION

This application claims priority to German Patent Application No. 102019106529.1 filed on Mar. 14, 2019, the content of which is incorporated by reference herein in its entirety.

TECHNICAL FIELD

The present description relates generally to the field of radar sensors, and signal processing methods used in radar sensors, which make it possible to suppress disruptive interference.

BACKGROUND

Radar sensors are used in a number of applications to detect objects, wherein the detection usually comprises measuring distances and speeds of the detected objects. In particular in the automotive sector, there is an increasing need for radar sensors that are able to be used, inter alia, in driving assistance systems (advanced driver assistance systems, ADAS), such as for example in adaptive cruise control (ACC) or radar cruise control systems. Such systems are automatically able to adjust the speed of a motor vehicle, in order thereby to maintain a safe distance from other motor vehicles traveling in front (and from other objects and from pedestrians). Further applications in the automotive sector are for example blind spot detection, lane change assist and the like. In the field of autonomous driving, radar sensors and systems having a plurality of sensors will play an important role in controlling autonomous vehicles.

Since automobiles are increasingly equipped with radar sensors, the probability of interference increases. That is to say, a radar signal emitted by a first radar sensor (installed in a first vehicle) may spread into the reception antenna of a second radar sensor (installed in a second vehicle). The first radar signal may interfere with an echo of the second radar signal in the second radar sensor and thereby impair the operation of the second radar sensor.

SUMMARY

A method for a radar device is described below. According to one example implementation, the method comprises transmitting a radio-frequency (RF) transmission signal that comprises a plurality of frequency-modulated chirps, and receiving an RF radar signal and generating a dataset containing in each case a particular number of digital values based on the received RF radar signal. A dataset may in this case be associated with a chirp or a sequence of successive chirps. The method furthermore comprises filtering the dataset by way of a neural network to which the dataset is fed in order to reduce an interfering signal contained therein. A convolutional neural network is used as neural network.

A further example implementation relates to a radar device having a radar transmitter and a radar receiver. The radar transmitter is designed to output an RF transmission signal that comprises a plurality of frequency-modulated chirps. The radar receiver is designed to receive an RF radar signal and, based thereon, to generate a dataset containing in each case a particular number of digital values. A dataset may in this case be associated with a chirp or a sequence of successive chirps. The radar device furthermore comprises a neural network to which the dataset is fed and that is designed to filter the dataset in order to reduce an interfering signal contained therein. A convolutional neural network is used as neural network.

According to a further example implementation, the radar device comprises a radar receiver that is designed to receive an RF radar signal and, based thereon, to generate a digital signal that comprises a plurality of signal segments. The radar device furthermore comprises a neural network having a plurality of layers each having one or more neurons, wherein the signal segments are fed to an input layer of the plurality of layers and wherein the plurality of layers are designed to process the signal segments of the digital signal. An output layer of the plurality of layers has at least one neuron that delivers an output value that indicates whether a respective signal segment or a sample, able to be associated with the neuron, of the signal segment is overlaid with an interfering signal.

BRIEF DESCRIPTION OF THE DRAWINGS

Example implementations are explained in more detail below with reference to drawings. The illustrations are not necessarily true to scale, and the example implementations are not restricted just to the aspects that are illustrated. Rather, value is placed on illustrating the principles underlying the example implementations. In the drawings.

DETAILED DESCRIPTION

Figure 1:
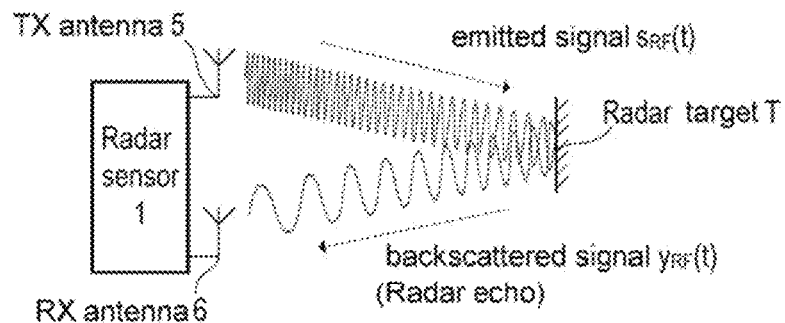
FIG. 1 is a sketch for illustrating functions of an FMCW radar system for distance and/or speed measurement.

FIG. 1 illustrates, in a schematic diagram, the application of a frequency-modulated continuous-wave radar system—usually referred to as FMCW radar system—in the form of a sensor for measuring distances and speeds of objects, which are usually referred to as radar targets. In the present example, the radar device 1 has separate transmission (TX) and reception (RX) antennas 5 and 6, respectively (bistatic or pseudo-monostatic radar configuration). It is however noted that a single antenna may also be used that serves simultaneously as transmission antenna and as reception antenna (monostatic radar configuration). The transmission antenna 5 emits a continuous RF signal $s_{RF}(t)$, which is frequency-modulated for example with a type of sawtooth signal (periodic linear frequency ramp). The emitted signal $s_{RF}(t)$ is backscattered at the radar target T and the backscattered/reflected signal $y_{RF}(t)$ (echo signal) is received by the reception antenna 6. FIG. 1 shows a simplified example; in practice, radar sensors are systems with a plurality of transmission (TX) and reception (RX) channels in order also to be able to determine the direction of arrival (DoA) of the backscattered/reflected signal $y_{RF}(t)$ and thus locate the radar target T with greater accuracy.

Figure 2:
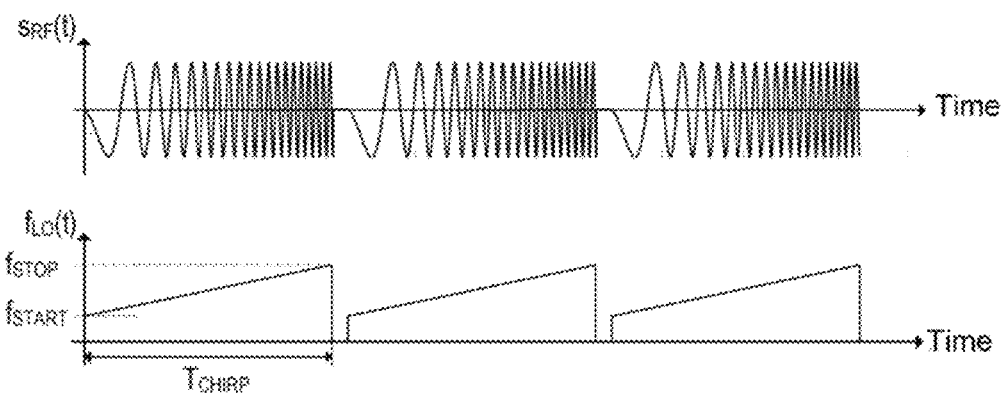
FIG. 2 comprises two timing diagrams for illustrating the frequency modulation (FM) of the RF signal generated by the FMCW system.

FIG. 2 illustrates, by way of example, the frequency modulation of the signal $s_{RF}(t)$. As illustrated in FIG. 2 (top graph), the emitted RF signal $s_{RF}(t)$ is composed of a series of "chirps", that is to say the signal $s_{RF}(t)$ comprises a sequence of sinusoidal signal profiles (waveforms) with rising frequency (up-chirp) or falling frequency (down-chirp). In the present example, the instantaneous frequency $f_{LO}(t)$ of a chirp increases linearly, starting at a start frequency $f_{START}$, to a stop frequency $f_{STOP}$ within a time interval $T_{RAMP}$ (see bottom graph in FIG. 2). Such chirps are also referred to as linear frequency ramps. FIG. 2 illustrates three identical linear frequency ramps. It is however noted that the parameters $f_{START}$, $f_{STOP}$, $T_{RAMP}$ and the pause between the individual frequency ramps may vary. The frequency variation also does not necessarily have to be linear (linear chirp). Depending on the implementation, transmission signals with exponential or hyperbolic frequency variation (exponential or hyperbolic chirps) may also be used, for example. For a measurement, a sequence of frequency ramps is emitted and the resulting echo signal is evaluated in baseband in order to detect one or more radar targets.

Figure 3:
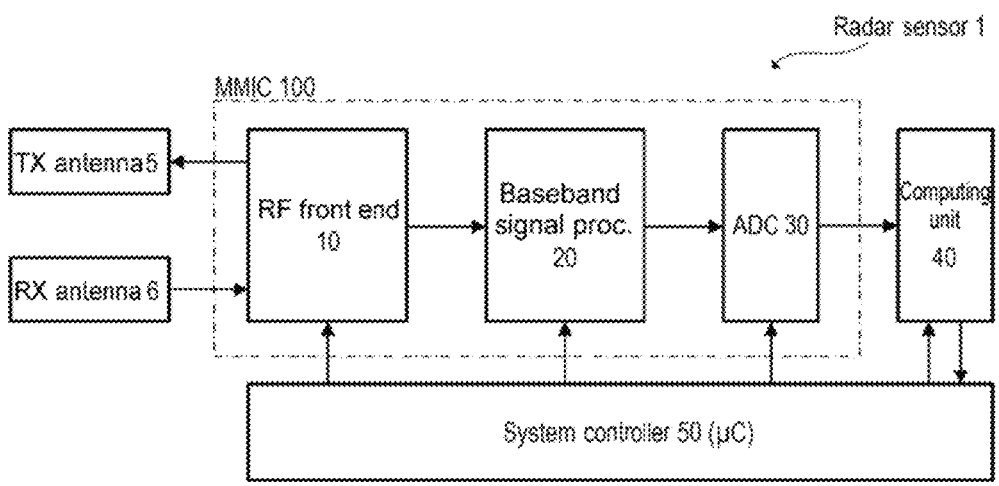
FIG. 3 is a block diagram for illustrating the structure of an FMCW radar system.

FIG. 3 is a block diagram that illustrates, by way of example, one possible structure of a radar device 1 (radar sensor). Accordingly, at least one transmission antenna 5 (TX antenna) and at least one reception antenna 6 (RX antenna) are connected to an RF front end 10 integrated into a chip, which front end may contain all those circuit components that are used for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 10 may—possibly together with further circuit components—be integrated into a chip, which is usually referred to as a monolithic microwave integrated circuit (MMIC). The IF band is sometimes also referred to as baseband. No further distinction is drawn below between baseband and IF band, and only the term baseband is used. Baseband signals are those signals on the basis of which radar targets are detected.

The example illustrated shows a bistatic (or pseudo-monostatic) radar system with separate RX and TX antennas. In the case of a monostatic radar system, the same antenna would be used both to emit and to receive the electromagnetic (radar) signals. In this case, a directional coupler (for example a circulator) may for example be used to separate the RF signals to be emitted from the received RF signals (radar echo signals). As mentioned, radar systems in practice usually have a plurality of transmission and reception channels with a plurality of transmission and reception antennas (antenna arrays), which makes it possible, inter alia, to measure the direction (DoA) from which the radar echoes are received. In the case of such MIMO systems (MIMO=multiple-input multiple-output), the individual TX channels and RX channels are usually in each case constructed identically or similarly and may be distributed over a plurality of integrated circuits (MMICs).

In the case of an FMCW radar system, the RF signals emitted by the TX antenna 5 may be for example in the range of approximately 20 GHz to 100 GHz (for example in the range of approximately 76-81 GHz in some applications). As mentioned, the RF signal received by the RX antenna 6 contains the radar echoes (chirp echo signals), that is to say those signal components that are backscattered at one or at a plurality of radar targets. The received RF signal $y_{RF}(t)$ is downmixed for example into baseband and processed further in baseband by way of analog signal processing (see FIG. 3, analog baseband signal processing chain 20). The analog signal processing essentially comprises filtering and possibly amplifying the baseband signal. The baseband signal is finally digitized (see FIG. 3, analog-to-digital converter 30) and processed further in the digital domain. The digital signal processing chain may be implemented at least partly in the form of software that is able to be executed on a processor, for example a microcontroller or a digital signal processor (see FIG. 3, computing unit 40). The overall system is generally controlled by way of a system controller 50 that may likewise be implemented at least partly in the form of software that is executed on a processor, such as for example a microcontroller. The RF front end 10 and the analog baseband signal processing chain 20 (optionally also the analog-to-digital converter 30 and the computing unit 40) may be integrated together in a single MMIC (that is to say an RF semiconductor chip). As an alternative, the individual components may also be distributed over a plurality of MMICs. The computing unit 40 or parts thereof may be contained in the system controller 50.

Figure 4:
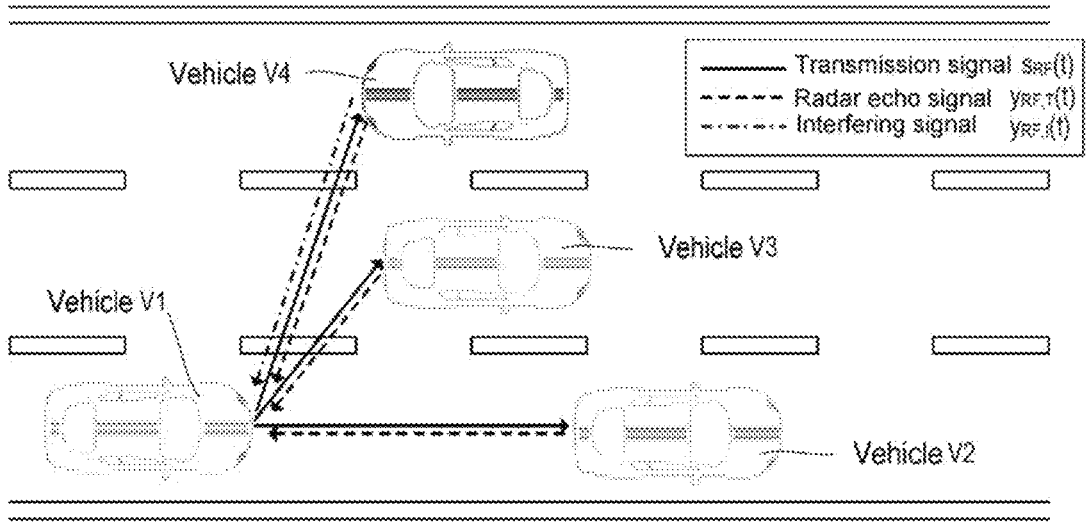
FIG. 4 is a sketch for illustrating an example of how interfering signals may be spread into the reception antenna of a radar sensor.

FIG. 4 illustrates a simple example for illustrating how an interferer may interfere with the received radar echoes. FIG. 4 illustrates a road with three lanes and four vehicles V1, V2, V3 and V4. At least the vehicles V1 and V4 are equipped with radar sensors. The radar sensor of the vehicle V1 emits an RF radar signal $s_{RF}(t)$ and the received RF radar signal $y_{RF}(t)$ contains the radar echoes from the vehicles V2 and V3 in front and the oncoming vehicle V4. The RF radar signal $y_{RF}(t)$ received by the radar sensor of the vehicle V1 furthermore contains a radar signal (interfering signal) that was generated by the radar sensor of the oncoming vehicle V4. The radar sensor of the vehicle V4 is an interferer for the radar sensor of the vehicle V1.

The signal $y_{RF}(t)$ received by the radar sensor of the vehicle V1 may be written as follows in the case of U radar targets and V interferers:

$$y_{RF}(t)=y_{RF,T}(t)+y_{RF,I}(t), \text{ wherein} \tag{1}$$

$$y_{RF,T}(t)=\Sigma_{i=0}^{U-1} A_{T,i} \cdot s_{RF}(t-\Delta_{T,i}) \text{ and} \tag{2}$$

$$y_{RF,I}(t)=\Sigma_{k=0}^{V-1} A_{I,k} \cdot s_{RF,k}'(t-\Delta t_{I,k}). \tag{3}$$

In the above equations (1) to (3), the signal components $y_{RF,T}(t)$ and $y_{RF,I}(t)$ of the received signal $y_{RF}(t)$ correspond to the radar echoes from real radar targets $T_i$ and the interfering signals. A plurality of radar echoes and a plurality of interferers may be present in practice. Equation (2) therefore represents the sum of the radar echoes that are caused by U different radar targets $T_i$, wherein $A_{T,i}$ denotes the attenuation of the emitted radar signal and $\Delta t_{T,i}$ denotes the outward and return propagation time (round trip delay time, RTDT) for a particular radar target $T_i$. Similarly, equation (3) represents the sum of the interfering signals that are caused by V interferers. In this case, $A_{I,k}$ denotes the attenuation of the interfering signal $s_{RF,k}'(t)$ emitted by an interferer and $\Delta t_{I,k}$ represents the associated signal propagation time (for each interferer k=0, 1, . . . , V−1). It is noted that the radar signal $s_{RF}(t)$ emitted by the vehicle V1 and the interfering signal $s_{RF,0}'(t)$ emitted by the vehicle V4 (index k=0 for vehicle V4) will generally have different chirp sequences with different chirp parameters (start/stop frequency, chirp duration, repetition rate, etc.). The amplitude of the received interfering signal component $y_{RF,I}(t)$ may furthermore be considerably higher than the amplitude of the echo signal component $y_{RF,T}(t)$.

Figure 5:
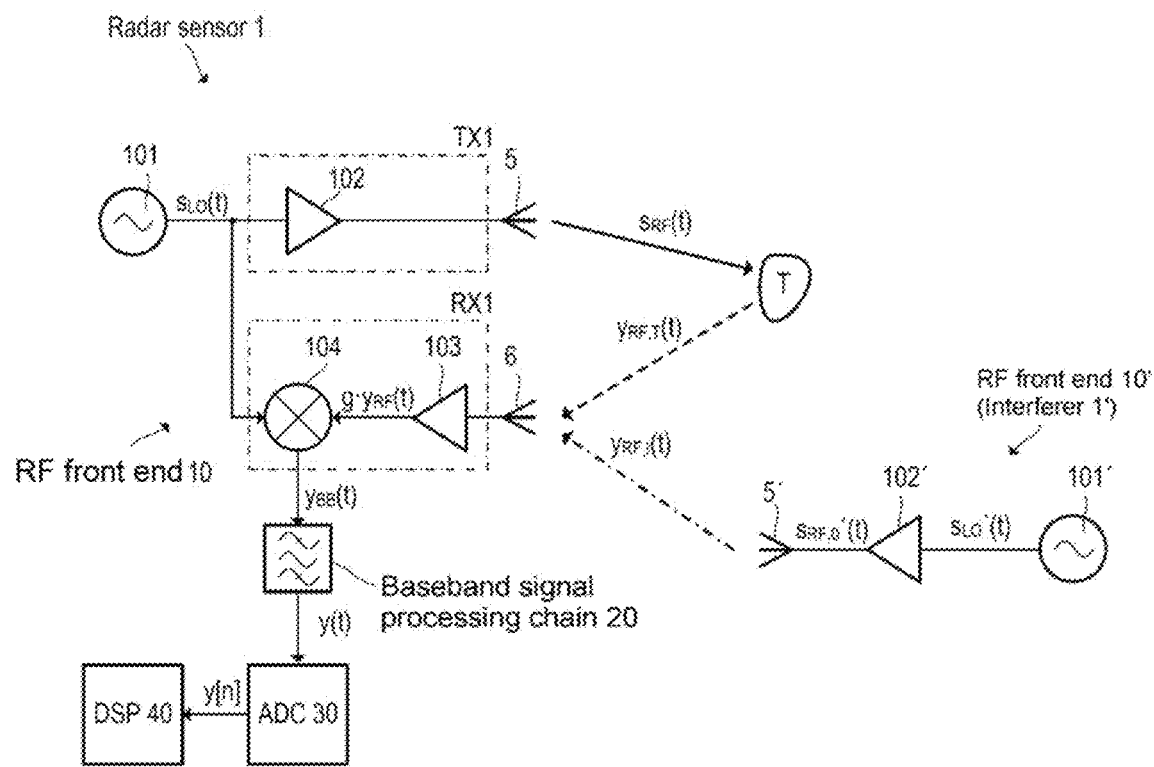
FIG. 5 is a circuit diagram for illustrating a simplified example of a radar transceiver and a further radar transceiver that causes interference.

FIG. 5 illustrates one example implementation of a radar transceiver 1 according to the example from FIG. 3 in more detail. The present example in particular illustrates the RF front end 10 of the radar transceiver 1 and the RF front end 10' of another (interfering) radar sensor 1'. It is noted that FIG. 5 illustrates a simplified circuit diagram in order to show the fundamental structure of the RF front end 10 with one transmission channel (TX channel) and one reception channel (RX channel). As mentioned, actual implementations, which may depend greatly on the specific application, are usually more complex and have a plurality of TX and/or RX channels.

The RF front end 10 comprises a local oscillator 101 (LO) that generates an RF oscillator signal $s_{LO}(t)$. During operation—as described above with reference to FIG. 2—the RF oscillator signal $s_{LO}(t)$ is frequency-modulated and is also referred to as LO signal. In radar applications, the LO signal is usually in the SHF (super high frequency, centimeter wave) or in the EHF (extremely high frequency, millimeter wave) band, for example in the interval from 76 GHz to 81 GHz in some automotive applications. The LO signal $s_{LO}(t)$ is processed both in the transmission signal path TX1 (in the TX channel) and in the reception signal path RX1 (in the RX channel).

The transmission signal $s_{RF}(t)$ (cf. FIG. 2) emitted by the TX antenna 5 is generated by amplifying the LO signal $s_{LO}(t)$, for example by way of the RF power amplifier 102, and is thus merely an amplified and possibly phase-shifted version of the LO signal $s_{LO}(t)$. The output of the amplifier 102 may be coupled to the TX antenna 5 (in the case of a bistatic or pseudo-monostatic radar configuration). The reception signal $y_{RF}(t)$ received by the RX antenna 6 is fed to the receiver circuit in the RX channel and therefore directly or indirectly to the RF port of the mixer 104. In the present example, the RF reception signal $y_{RF}(t)$ (antenna signal) is pre-amplified by way of the amplifier 103 (amplification g). The mixer 104 thus receives the amplified RF reception signal g $y_{RF}(t)$. The amplifier 103 may be for example an LNA (low-noise amplifier). The LO signal $s_{LO}(t)$ is fed to the reference port of the mixer 104, such that the mixer 104 downmixes the (pre-amplified) RF reception signal $y_{RF}(t)$ into baseband. The downmixed baseband signal (mixer output signal) is referred to as $y_{BB}(t)$. This baseband signal $y_{BB}(t)$ is initially processed further in an analog manner, wherein the analog baseband signal processing chain 20 essentially brings about amplification and (for example band-pass or low-pass) filtering in order to suppress undesired sidebands and mirror frequencies. The resulting analog output signal, which is fed to an analog-to-digital converter (see FIG. 3, ADC 30), is referred to as y(t). Methods for the digital further processing of the digitized output signal (digital radar signal y[n]) are known per se (for example range Doppler analysis) and are therefore not discussed in more detail here. A few basics of range Doppler analysis are however explained further below with reference to FIG. 9.

In the present example, the mixer 104 downmixes the pre-amplified RF reception signal $g \cdot y_{RF}(t)$ (that is to say the amplified antenna signal) into baseband. The mixing may be performed in one stage (that is to say from the RF band directly into baseband) or over one or more intermediate stages (that is to say from the RF band into an intermediate frequency band and further into baseband). In this case, the reception mixer 104 effectively comprises a plurality of individual mixer stages connected in series. With regard to the example shown in FIG. 5, it becomes clear that the quality of a radar measurement depends strongly on the quality of the LO signal $s_{LO}(t)$, for example on the noise contained in the LO signal $s_{LO}(t)$, which is determined in terms of quantity by the phase noise of the local oscillator 101. A simple mixer is used in the illustrated example. As an alternative, in other example implementations, IQ mixers may also be used in order to generate complex baseband signals (in-phase and quadrature components).

FIG. 5 furthermore shows part (the TX channel of the RF front end 10') of a further radar sensor 1' that constitutes an interferer for the radar sensor 1. The RF front end 10' of the radar sensor 1' contains a further local oscillator 101' that generates an LO signal $s_{LO}'(t)$ that is amplified by the amplifier 102'. The amplified LO signal is emitted, as RF radar signal $s_{RF,0}'(t)$, by the antenna 5' of the radar sensor 1' (cf. equation (3)). This RF radar signal $s_{RF,0}'(t)$ contributes to the interfering signal component $y_{RF,I}(t)$ received by the antenna 6 of the other radar sensor 1 and may cause the interference.

Figure 6:
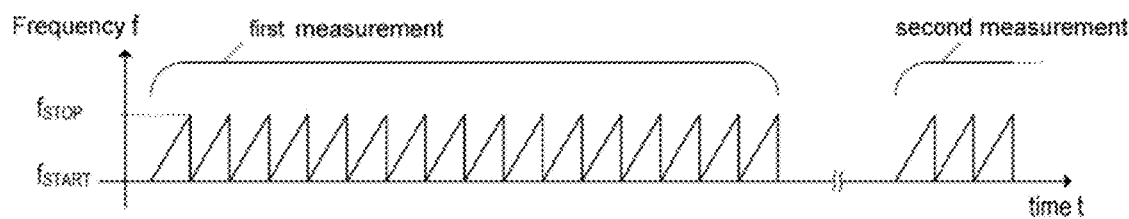
FIG. 6 shows a timing diagram (frequency over time) of an example of an emitted radar signal containing a plurality of sequences of chirps, wherein each sequence has a particular number of chirps that are used for a measurement.

FIG. 6 schematically illustrates an example of an FM scheme as is usually used in FMCW radar sensors in the frequency modulation (FM) of the LO signal $s_{LO}(t)$. A sequence of chirps is generated for each measurement in the illustrated example. The first sequence contains only 16 chirps in FIG. 6. In practice, however, a sequence may contain considerably more chirps, for example 128 or 256 chirps. A number that corresponds to a power of two makes it possible to use efficient FFT (fast Fourier transform)

algorithms in the subsequent digital signal processing (for example in range Doppler analysis). There may be a pause between the individual sequences.

Figure 7:
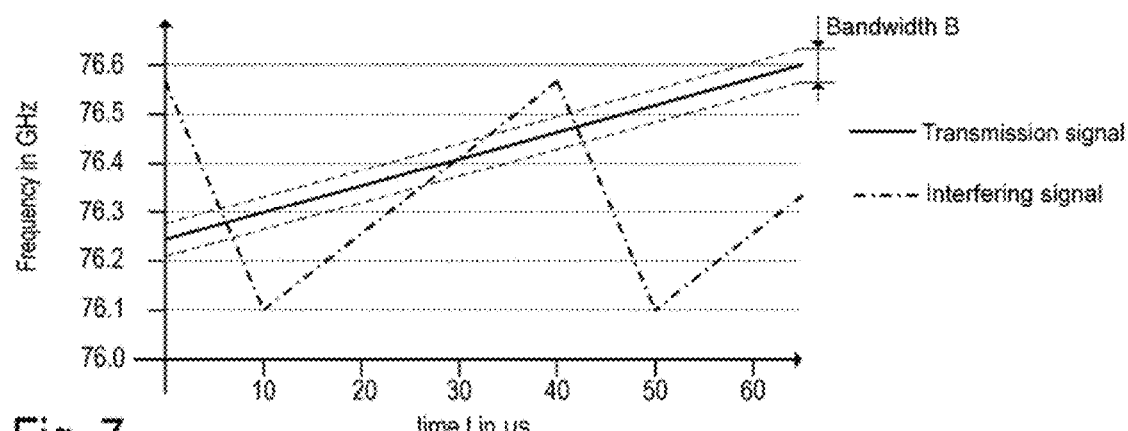
FIG. 7 shows a timing diagram of a transmission signal of a radar sensor and of a transmission signal (interfering signal), causing interference, of a further radar sensor (interferer), wherein the signal profiles (frequency over time) of these signals partly overlap.
Figure 8:
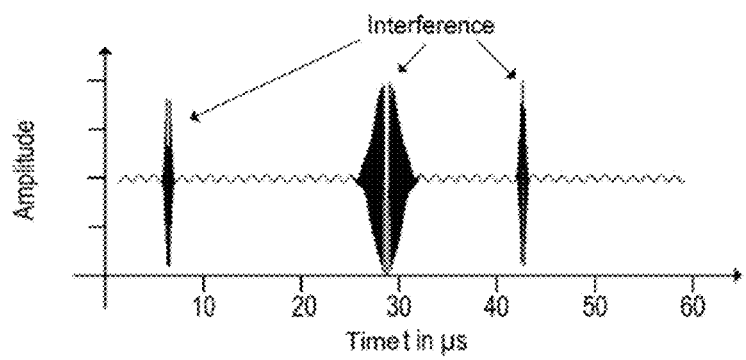
FIG. 8 shows a timing diagram of an example signal profile of a radar signal (after mixing into baseband) that contains a radar echo from a radar target and an interfering signal (interference).

FIGS. 7 and 8 illustrate, on the basis of an example, how an interferer is able to interfere with the radar echoes that are contained in the RF signal $y_{RF}(t)$ received by the radar sensor 1. FIG. 7 shows a graph (frequency over time) of a chirp, emitted by the radar sensor 1, with a chirp duration of 60 μs (solid line). The start frequency of the emitted signal $s_{RF}(t)$ is approximately 76250 MHz, and the stop frequency is approximately 76600 MHz. An interfering signal $y_{RF,I}(t)$ generated by another radar sensor contains an up-chirp with a start frequency of approximately 76100 MHz, a stop frequency of approximately 76580 MHz and a chirp duration of 30 μs and a subsequent down-chirp that starts at the stop frequency of the preceding chirp and ends at the start frequency of the preceding chirp and has a chirp duration of 10 μs (dot-and-dash line). The bandwidth B of the baseband signal of the radar sensor is defined essentially by the baseband signal processing chain 20 and is indicated by the dashed lines in FIG. 7. FIG. 8 shows an example signal profile of the (pre-processed) baseband signal y(t) of the radar sensor 1. It is able to be seen that the signal components caused by the interference in that time interval at which the frequency of the interfering signal lies within the bandwidth B of the radar sensor have a significant amplitude (see FIGS. 7 and 8). In the present example, the interference occurs three times during the chirp duration of 60 μs, specifically at approximately 7 μs, 28 μs and 42 μs. As mentioned, the power of the interfering signal may be higher than the power of the radar echo from real targets. The interfering signals and the transmission signal of the radar sensor 1 under consideration are furthermore uncorrelated (other than exceptions that are not considered here), for which reason the interference may be considered to be noise (within the meaning of broadband interference) and thus increases the noise floor.

Figure 9:
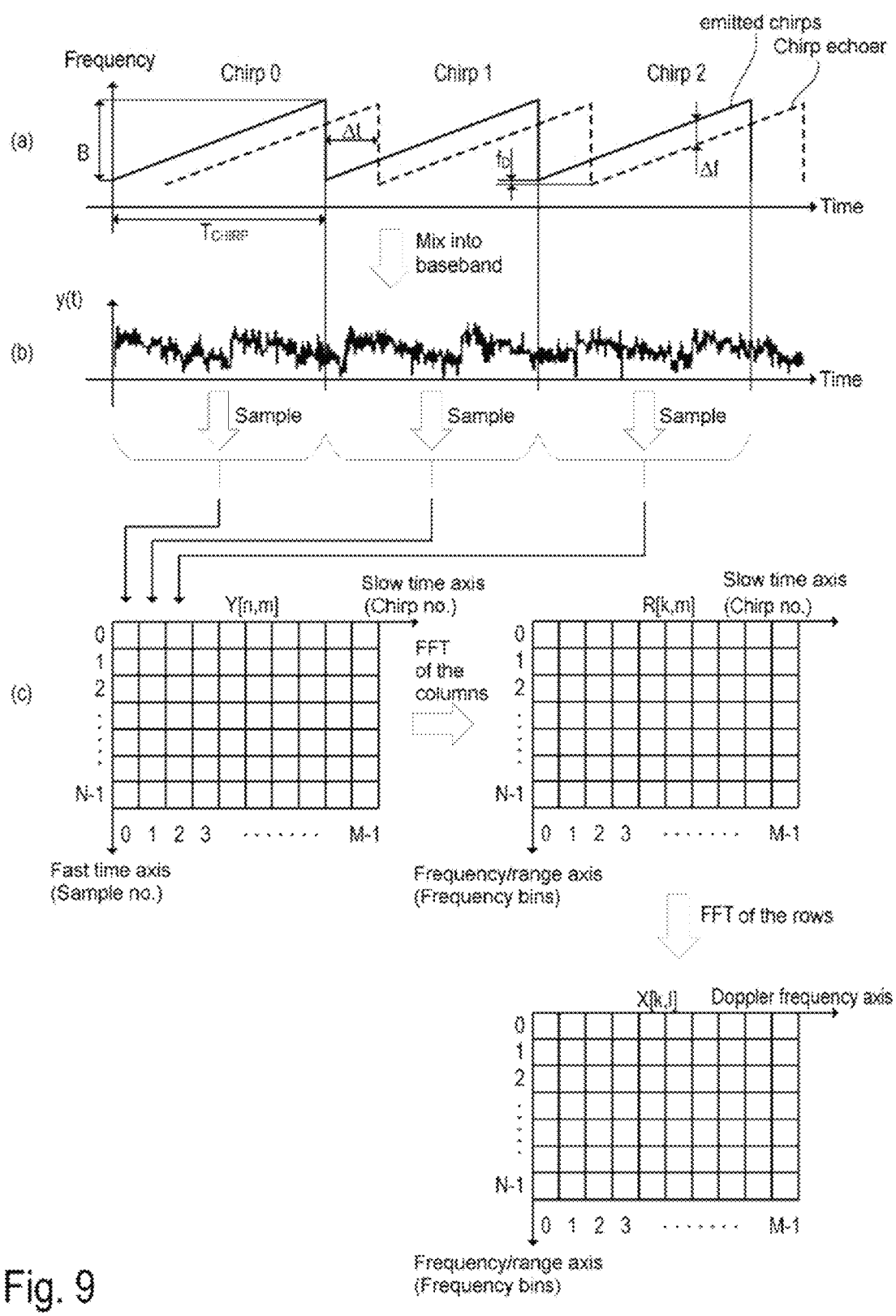
FIG. 9 illustrates, by way of example, the digital signal processing of radar signals in range Doppler analysis.

Before interfering signal suppression is discussed in more detail, a brief summary is given below of the signal processing usually performed in a radar sensor in order to detect radar targets. FIG. 9 illustrates, with reference to an example, the analog signal processing of a radar sensor as far as the digitization of the baseband signal that represents the chirp echo signals, and the subsequent digital processing. Graph (a) in FIG. 9 shows part of a chirp sequence that comprises M linear chirps. The solid line represents the signal profile (waveform, frequency over time) of the outgoing RF radar signal $s_{RF}(t)$, and the dashed line represents the corresponding signal profile of the arriving (and pre-amplified) RF radar signal $y_{RF}(t)$ that (when present) contains the chirp echoes. According to graph (a) in FIG. 9, the frequency of the outgoing radar signal increases linearly, starting at a start frequency $f_{START}$, up to a stop frequency $f_{STOP}$ (chirp no. 0) and then drops back to the start frequency $f_{START}$, increases again up to the stop frequency $f_{STOP}$ (chirp no. 1), and so on.

As explained above with reference to FIG. 6, a chirp sequence comprises a plurality of chirps; in the present case, the number of chirps in a sequence is denoted M. Depending on the application, a sequence may also contain chirps with different parameters (start and stop frequency, duration and modulation pause). During a modulation pause between two successive chirps, the frequency may for example be the same as the stop frequency of the previous chirp or the start frequency of the following chirp (or the same as another frequency). The chirp duration may be in the range from a few microseconds up to a few milliseconds, for example in the range from 20 μs to 2 ms. The actual values may also be greater or smaller depending on the application. The number M of chirps in a sequence may correspond to a power of two, for example M=256.

The arriving RF radar signal $y_{RF}(t)$ (that is to say received by the RX antenna) lags the outgoing RF radar signal $s_{RF}(t)$ (that is to say emitted by the TX antenna) by a time difference Δt. This time difference Δt corresponds to the signal propagation time from the TX antenna to the radar target and back to the RX antenna, and is also referred to as round trip delay time (RTDT). The distance $d_{T_i}$ of a radar target $T_i$ from the radar sensor is $d_{T_i} = c \cdot \Delta t/2$, that is to say the speed of light c times half the time difference Δt. As is able to be seen in graph (a) in FIG. 9, the time difference Δt results in a corresponding frequency difference Δf. This frequency difference Δf may be determined by mixing the arriving (and possibly pre-amplified) radar signal $y_{RF}(t)$ with the LO signal $s_{LO}(t)$ of the radar sensor (see FIG. 5, mixer 104), digitizing the resulting baseband signal y(t) and then performing digital spectral analysis. The frequency difference Δf then appears in the spectrum of the digitized baseband signal y[n] as what is called the beat frequency. If linear chirps are used, the time difference Δt may be calculated according to Δt=Δf/k, wherein the factor k denotes the gradient (hertz per second) of the frequency ramp that is able to be calculated according to $k=B/T_{CHIRP}$, wherein B is the bandwidth of a chirp ($B=|f_{STOP}-f_{START}|$). With regard to the above explanations, it follows, for the sought distance $d_{T_i}$ of the target $T_i$:

$$d_{T_i} = c \cdot \Delta t/2 = c \cdot \Delta f \cdot T_{CHIRP}/(2B) \qquad (4)$$

Although the basic functional principle of an FMCW radar sensor has been summarized above, it is noted that more sophisticated signal processing is usually applied in practice. By way of example, an additional Doppler shift $f_D$ of the arriving signal caused by the Doppler effect may influence the distance measurement, this adding the Doppler shift $f_D$ to the frequency difference Δf explained above. Depending on the application, the Doppler shift may be estimated/calculated from the outgoing and arriving radar signals and be taken into consideration in the measurement, whereas the Doppler shift may be negligible for the distance measurement in some applications. This may for example be the case when the chirp duration is high and the speed of the target is low, such that the frequency difference Δf is large in comparison with the Doppler shift $f_D$. In some radar systems, the Doppler shift may be eliminated by determining the distance based on an up-chirp and a down-chirp in the distance measurement. In theory, the actual distance $d_T$ may be calculated as the average of the distance values obtained from a measurement using up-chirps and a further measurement using down-chirps. The Doppler shift is eliminated through the averaging.

One example of a signal processing technique for processing FMCW signals involves calculating what are known as range Doppler maps, which are also referred to as range Doppler images. In general, FMCW radar sensors determine the target information (that is to say distance, speed, DoA) by emitting a sequence of chirps (see FIG. 9, graph (a)) and mixing the (delayed) echoes from the radar targets with a "copy" of the emitted signal (cf. FIG. 5, mixer 104). The resulting baseband signal y(t) is illustrated in graph (b) in FIG. 9. This baseband signal y(t), and therefore also the digitized baseband signal y[n] (digital radar signal), may be divided into a plurality of segments, wherein each segment of the digital radar signal y[n] is associated with a particular chirp of the chirp sequence.

The target information may be extracted from the spectrum of the segments of the digital radar signal y[n], containing the chirp echoes generated by one or more radar targets. A range Doppler map is for example obtained, as explained in more detail below, by way of a two-stage Fourier transformation. Range Doppler maps may be used as a basis for various methods for detecting, identifying and classifying radar targets. The result of the first Fourier transformation stage is referred to as a range map. The methods described here for interfering signal suppression may be performed in the segments of the digital radar signal and/or their spectra that are contained in such a range map.

In the examples illustrated here, the calculations to determine the range Doppler maps are performed by a digital computing unit, such as for example a signal processor (cf. FIG. 5, a computing unit 40, such as DSP 40). In other example implementations, in addition or as an alternative to a signal processor, other computing units may also be used in order to perform the calculations. Depending on the implementation, the calculations may be performed by different software and hardware entities or combinations thereof. The term computing unit may typically be understood to mean any combination of software and hardware that is capable of and designed to perform the calculations that are described in connection with the example implementations explained here.

According to one example implementation, the calculation of a range Doppler map involves two stages, wherein a plurality of Fourier transformations are calculated in each stage (for example by way of an FFT algorithm). According to the present example, the baseband signal y(t) (cf. FIG. 5) is sampled such that N×M sampled values (samples), that is to say M segments each containing N samples, are obtained for a chirp sequence containing M chirps. That is to say, the sampling time interval $T_{SAMPLE}$ is selected such that each of the M segments (chirp echoes in baseband) is represented by a sequence of N samples. As illustrated in diagram (c) in FIG. 9, these M segments with in each case N samples may be arranged in a two-dimensional array Y[n, m] (radar data array). Each column of the array Y[n, m] represents one of the M segments under consideration of the baseband signal y(t), and the nth row of the array Y[n, m] contains the nth sample of the M chirps. The row index n (n=0, 1, ... N−1) may thus be considered to be a discrete time n $T_{SAMPLE}$ (within a chirp) on a "fast" time axis. Similarly, the column index m (m=0, 1, ... M−1) may be considered to be a discrete time m·$T_{CHIRP}$ on a "slow" time axis. The column index m corresponds to the number of the chirp in a chirp sequence.

In a first stage, a first FFT (usually referred to as range FFT) is applied to each chirp. The Fourier transformation is calculated for each column of the array Y[n, m]. In other words, the array Y[n, m] is Fourier-transformed along the fast time axis, and a two-dimensional array Y[n, m] of spectra, referred to as range map, is obtained as a result, wherein each of the M columns of the range map in each case contains N (complex-value) spectral values. By virtue of the Fourier transformation, the "fast" time axis becomes the frequency axis; the row index k of the range map R[k, m] corresponds to a discrete frequency and is therefore also referred to as frequency bin. Each discrete frequency corresponds to a distance according to equation 4, for which reason the frequency axis is also referred to as distance axis (or range axis).

The range map R[k, m] is illustrated in diagram (c) in FIG. 9. A radar echo caused by a radar target results in a local maximum (peak) at a particular frequency index/frequency bin. This local maximum usually appears in all of the columns of the range map R[k, m], that is to say in the spectra of all of the segments under consideration of the baseband signal y[n] that are able to be associated with the chirps of a chirp sequence. As mentioned, the associated frequency index k (for example in accordance with equation 4) may be converted into a distance value.

In a second stage, a second FFT (usually referred to as Doppler FFT) is applied to each of the N rows of the range map R[k, m] (k=0, ... , N−1). Each row of the range map R[k, m] contains M spectral values of a particular frequency bin, wherein each frequency bin corresponds to a particular distance $d_{T_i}$ of a particular radar target $T_i$. The Fourier transformation of the spectral values in a particular frequency bin (able to be associated with a radar target) makes it possible to determine the associated Doppler shift $f_D$ that corresponds to a speed of the radar target. In other words, the two-dimensional array R[k, m] (the range map) is Fourier-transformed in rows, that is to say along the "slow" time axis. The resulting Fourier transforms again form an array containing N×M spectral values, which is referred to as range Doppler map X[k, l] (k=0, ... , N−1 und l=0, ... , M−1). The "slow" time axis becomes the Doppler frequency axis through the second FFT. The associated discrete Doppler frequency values each correspond to a particular speed. The Doppler frequency axis may accordingly be converted into a speed axis. In the examples described here, the dimensions of the matrices Y[n, m], R[k, m] and X[k, l] are equal to N×M, wherein N denotes the number of discrete frequency values (also referred to as frequency bins or bins) on the range axis and M denotes the number of discrete Doppler frequency values on the Doppler axis. This is however not necessarily the case. Depending on the implementation, the matrix Y[n, m] may be expanded (virtually) by way of zero padding, such that the range map R[k, m] has a dimension N'×M, where N'>N. It is mentioned for the sake of completeness that it may also be the case that N>N', for example if particular distance ranges are not required. The same applies analogously to the parameter M (number of signal segments/chirps in a sequence) with regard to the speed.

Each local maximum (each peak) in the range Doppler map X[k, l] indicates a potential radar target. The row index k (on the range axis) associated with a local maximum represents the distance of the target, and the column index l (on the speed axis) associated with the local maximum represents the speed of the target.

Several variants of a concept for detecting and/or reducing (for example interference-induced) disturbances contained in the measured values contained in a radar data array Y[n, m] are described below. The mth column of a radar data array Y[n, m]—that is to say the mth segment of a sequence of M segments of digital radar signal—is denoted $y_m[n]$ below. Each signal segment $y_m[n]$ may be associated with a particular chirp of a particular chirp sequence of the emitted RF radar signal $s_{RF}(t)$. FIGS. 10A-10D illustrates various example structures of suppressing/filtering or detecting interference-induced (and other) disturbances using artificial neural networks (ANNs).

Figure 10A:
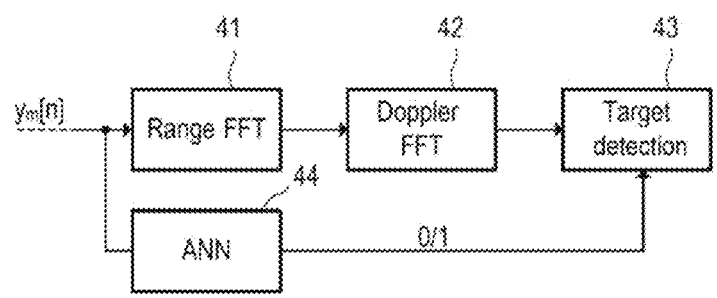
FIGS. 10A-10D illustrate various example structures of suppressing/filtering or detecting interference-induced (and other) disturbances using artificial neural networks.

The example shown in FIG. 10A relates to the detection of signal segments $y_m[n]$ that are impacted by interference using one or more artificial neural networks, and the subsequent digital signal processing in order to detect radar targets. The functional blocks illustrated in FIGS. 10A-10D may be implemented at least partly in software that is executed by one or more processors. These processors may for example be contained in the computing unit 40 and/or the controller 50 (cf. FIG. 3). The functions provided by the functional blocks illustrated in FIGS. 10A-10D may also however be implemented at least partly by way of hardwired ALUs (arithmetic logic units). By way of example, fast Fourier transform (FFT) algorithms are able to be implemented comparatively easily by way of hardware. In particular neural networks may be implemented by way of circuits (for example neuromorphic circuits) and processors (for example neuromorphic/neurosynaptic processors) that are specifically suitable for this purpose. Processors with hardware accelerators for artificial neural networks (within the meaning of fast vector signal processors having a high number of parallel multiplier-accumulate (MAC) units) likewise exist.

Figure 11:
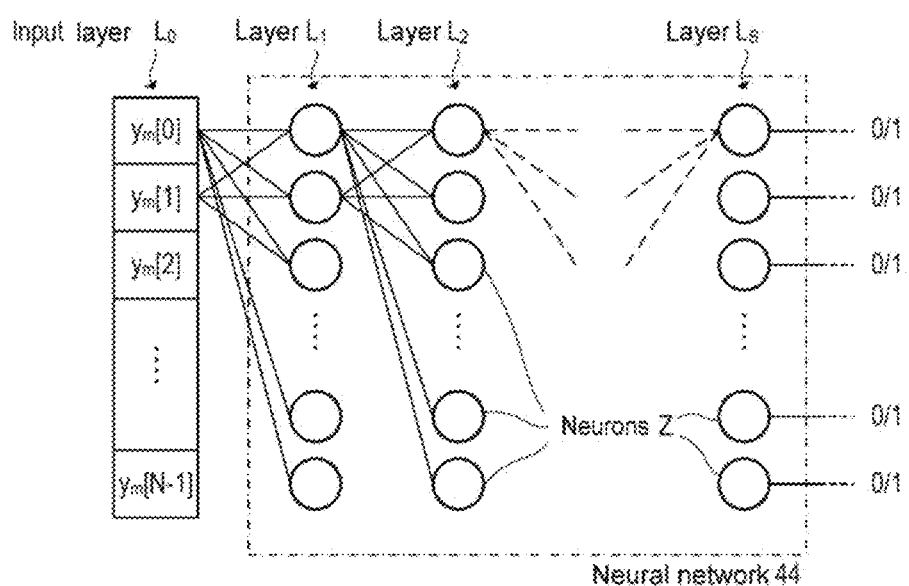
FIG. 11 illustrates a first example according to which individual samples of a received radar signal that are disturbed by interference are detected by way of a neural network.
Figure 13:
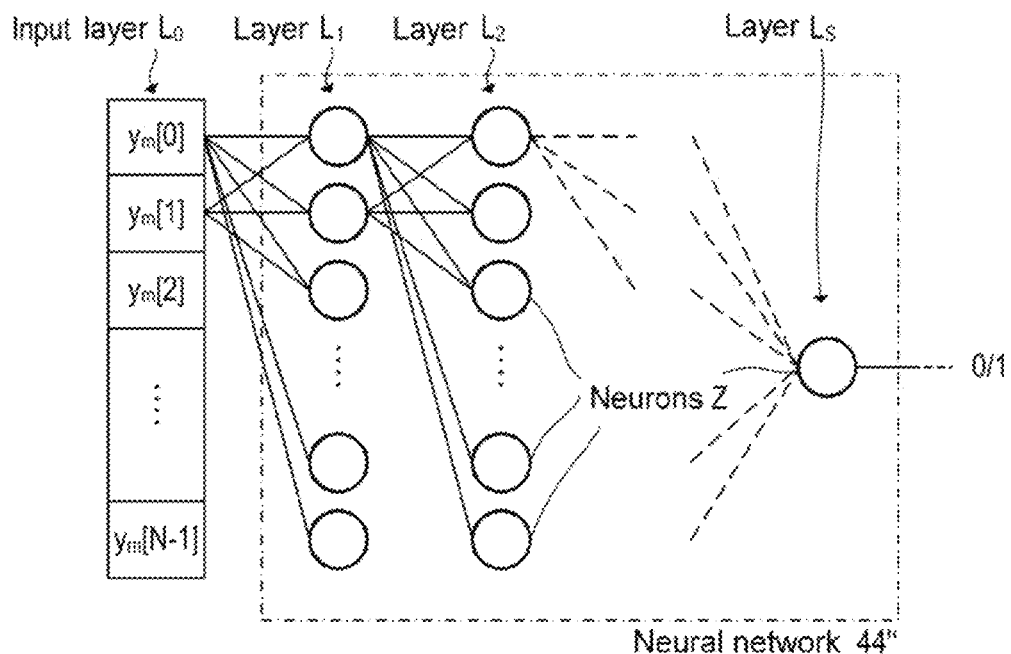
FIG. 13 illustrates a further example according to which signal segments of a received radar signal that are disturbed by interference are detected by way of a neural network.

According to FIG. 10A, the M signal segments $y_m[n]$ (m=0, ..., M−1, n=0, ..., N−1) are Fourier-transformed twice (range FFT 41, Doppler FFT block 42) in order to obtain a range Doppler map X[k, l]. The signal segments $y_m[n]$ are furthermore fed to the artificial neural network 44. The input of the artificial neural network 44 thus obtains, as input vector, the N sampled values $y_m[0]$ to $y_m[N-1]$ for each received signal segment m (that is associated with the respective chirp). The artificial neural network is trained to detect whether the respective signal segment or some of the samples contained therein are impacted by interference. The result of this detection is a yes/no decision (binary result) either for the respective signal segment on its own or for each individual sample contained therein. FIGS. 11 and 13 show examples of suitable neural network structures in more detail. The target detection (functional block 43) may then be performed based on the calculated range Doppler map X[k, l] and taking into consideration the output signal/the output signals from the neural network 44. In one modified example (not illustrated), the column vectors $r_m[k]$ of the range map R[l, m] are fed to the neural network 44 as input data instead of the signal segments $y_m[n]$.

Figure 10B:

The example shown in FIG. 10B relates to the reduction of interfering signal components in the signal segments $y_m[n]$ using one or more artificial neural networks, and the subsequent digital signal processing in order to detect radar targets. In this connection, the neural network 44' may be considered to be a filter that is designed to reduce or ideally to eliminate the interfering signal components that may be contained in the signal components $y_m[n]$. The desired filter characteristics may then be achieved by appropriately training the neural network 44'. The filtered signal segments (output signal from the neural network) are denoted $\hat{y}_m[n]$ in FIG. 10B. The subsequent calculation of the range FFT (block 41) and the Doppler FFT (block 42) and the target detection (block 43) is based on the filtered signal segments $\hat{y}_m[n]$ that may be combined to form a filtered radar data array $\hat{Y}[n, m]$ in which the interfering signal components have been reduced (ideally eliminated). The range FFT and Doppler FFT may be calculated in accordance with FIG. 8.

Figure 10C:
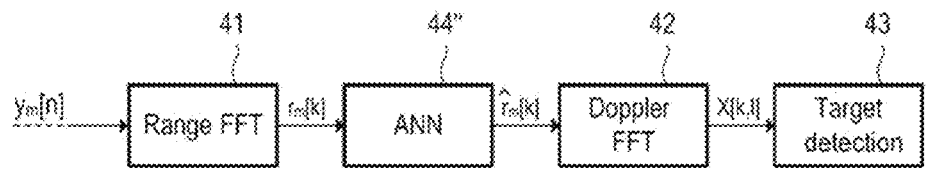

The example shown in FIG. 10C is highly similar to the previous example from FIG. 10B, apart from the fact that the artificial neural network 44" is arranged between the range FFT block 41 and the Doppler FFT block 42. The neural network 44" thus receives, as input data, not the signal segments $y_m[n]$ in the time domain, but rather in the frequency domain, that is to say the discrete spectra $r_m[k]$ that represent the columns of the range map R[k, m], that is to say $r_m[k]$ is the mth column of the range map R[k, m]. The neural network 44" delivers, as output data, the filtered spectra $\hat{r}_m[k]$, which may be combined to form a filtered range Doppler map $\hat{R}[k, m]$. In this example, the range Doppler map X[k, l] is obtained by Fourier-transforming the filtered range map $\hat{R}[k, m]$ (range FFT block 42). The target detection (functional block 43) may be performed as in the previous example.

Figure 10D:
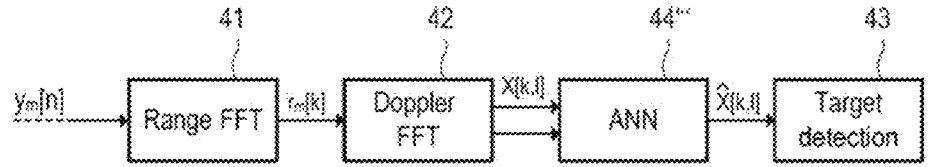

In a further, modified example, the artificial neural network is arranged between Doppler FFT (functional block 42) and target detection (functional block 43), such that the filtering brought about by the neural network "filtering" is performed in the Doppler frequency domain. This variant is illustrated in FIG. 10D. In this implementation, the filtering is two-dimensional. By way of example, filtering with a two-dimensional filter mask (kernel) may be used in a convolutional neural network. Example implementations of this variant are described in more detail further below in connection with FIGS. 14 to 16.

FIG. 11 illustrates an example implementation of a neural network 44 as may be used for example in the example from FIG. 10A. In the present example, the digital radar signal of each RX channel is processed in segments. That is to say, a signal segment $y_m[n]$ (that is to say the mth column of the radar data array Y[n, m]) may be considered to be a vector of input data of the neural network 44, wherein the vector has N values and may be associated with the sampled values of a particular chirp of the emitted RF chirp sequence. The input vector $y_m[n]$ at the same time forms the input layer $L_0$ of the neural network 44. The neural network generally has a plurality of layers $L_1$ to $L_S$, wherein the last layer $L_S$ is referred to as output layer that delivers the output data. In the present example, these output data are N binary (Boolean) values of an output vector that indicate whether the corresponding values of the input vector are impacted by noise or interference-induced disturbances.

According to the structure, shown in FIG. 11, of a neural network, each of the layers $L_1$ to $L_S$ has N neurons, wherein the output value $L_S[n]$ of the nth neuron of the sth layer may be determined as follows:

$$L_S[n]=\varphi(\Sigma_{N-1}^{i=0} w_{s,n}[i] \cdot L_{S-1}[i]), \text{ for } s=1, \ldots S. \quad (5)$$

The function $\varphi(\bullet)$ is usually called activation function, which is typically nonlinear. In other words, each neuron of a layer of the neural network determines a weighted sum of the output values from the previous layer and applies the activation function $\varphi(\bullet)$ to this weighted sum. In above equation (5), the weighting factors of the nth neuron in the sth layer $L_S$ are denoted $w_{s,n}[i]$, wherein the index i (i=0, ..., N−1) denotes the associated input value $L_{S-1}[i]$ that is delivered as output value by the previous layer. As mentioned, the layer $L_0$ denotes the input data vector $y_m[n]$ (where n=0, ..., N−1).

The weighting factors $w_{s,n}[i]$ are determined by training the neural network. In one example implementation, the neural network is what is known as a convolutional neural network in which the output value $L_S[n]$ of a neuron does not depend on all of the output values $L_{S-1}[i]$, but only on the "adjacent" values. In this case, equation 5 may be modified as follows.

$$L_S[n]=\varphi(\Sigma_{i=n-1}^{n+1} w_{s,n}[i] \cdot L_{S-1}[i]), \text{ for } s=1, \ldots S, \quad (6)$$

wherein the weighting factors $w_{s,n}[-1]$ and $w_{s,n}[N]$ may be zero (that is to say the weighting factors are supplemented with zeros at the "edge"), and wherein the index n=0, ... N−1 denotes a particular neuron in the respective layer. In this case, the weighted sum in equation 6 may also be considered to be a convolution of the output vector $L_{S-1}[i]$ of the previous layer with the kernel vector $w_{s,n}=(w_{s,n}[-1], w_{s,n}[0], w_{s,n}[1])$, and equation 6 may be written as follows:

$$L_S[n]=\varphi(\Sigma_{i=-1}^{1} w_s[i] \cdot L_{S-1}[n-i])=\varphi((w_{s,n} * L_{S-1})[n]), \quad (7)$$

wherein the operator * denotes the discrete convolution. Equations 6 and 7 relate to a special case with a kernel vector $w_s[i]$ having three elements. It is understood that kernel vectors having more than three elements may also be used. The kernel vector may also be referred to as convolution core, filter core, filter mask or simply just as kernel. In the case of a two-dimensional convolution (cf. FIG. 14), the kernel is a (two-dimensional) kernel matrix.

The activation function $\varphi(\cdot)$ is typically a nonlinear function. Different activation functions may be used depending on the application. Examples of customary activation functions are the step function, the sigmoid function or what is known as an ReLU function, wherein the abbreviation ReLU stands for rectifier linear unit. The ReLU function is usually defined as follows: $ReLU(x)=\max\{0, x\}$. The step function has the value 1 if its argument (that is to say the weighted sum from equations 5 to 7) is greater than or equal to a threshold value $\theta_{s,n}$, and otherwise the value 0.

Figure 12:
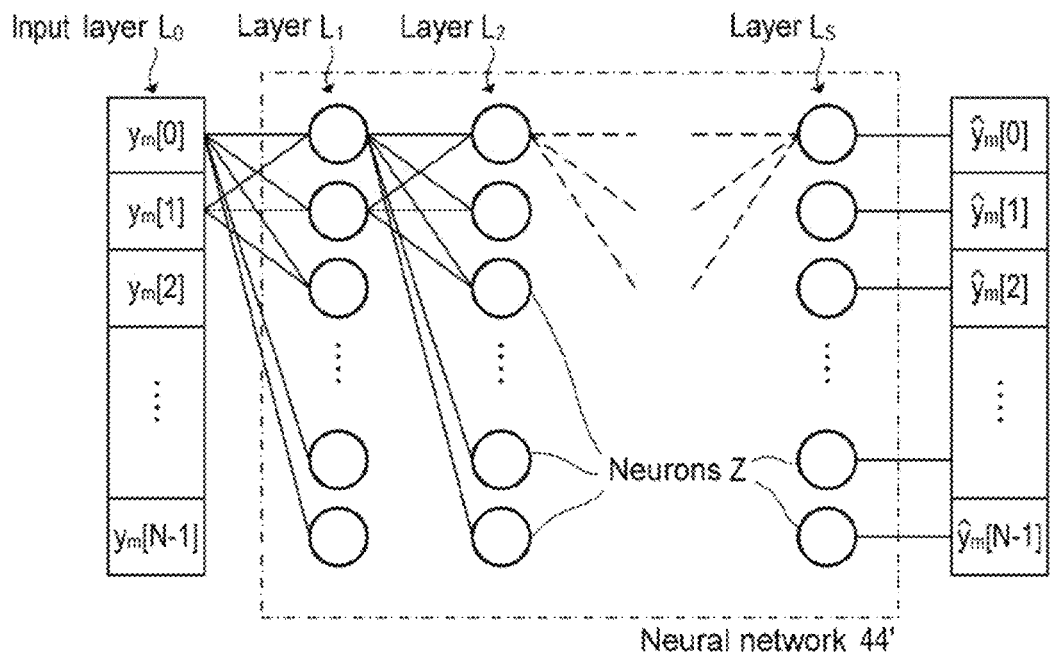
FIG. 12 illustrates a further example according to which signal segments of a received radar signal that are disturbed by interference are filtered by way of a neural network in order to reduce the interference contained in the respective signal segment.

The example from FIG. 12 is highly similar in terms of structure to the example from FIG. 11, and reference is made to the above description. Unlike in the example from FIG. 11, the neural network 44' however does not deliver any binary (Boolean) output values (yes/no decision), but rather a filtered version $\hat{y}[n]$ of the signal segment $y_m[n]$. A filtered radar data array $Y[n, m]$ that may serve as a basis for a range Doppler analysis may be constructed from the filtered signal segments. The neural network 44' will in this case typically not use a step function as activation function $\varphi(\cdot)$, but rather for example an ReLU function (since the output data are not Boolean values). For the rest, the neural network 44' differs from the neural network 44 from the previous example primarily through the training data that are used, by way of which the neural network is trained in a manner known per se.

The example from FIG. 13 may be considered to be a special case of the example from FIG. 11. The neural network 44" is highly similar in terms of structure to the neural network 44 from the example from FIG. 11, wherein—unlike in FIG. 11—only one neuron that delivers a Boolean output value is used in the output layer $L_S$ of the neural network 44". A plurality of neurons (up to N neurons) are used in the other layers $L_1$ to $L_{S-1}$. Since the neuron of the output layer $L_S$ delivers a Boolean value, a step function is used as activation function $\varphi(\cdot)$ in the present example—at least in the last layer. In general, the same activation function does not have to be used in each layer of a neural network.

The examples from FIGS. 11 and 13 correspond to the signal processing structure from FIG. 10A. The example from FIG. 12 corresponds to the signal processing structure from FIG. 10B. As already mentioned, the corresponding values $r_m[k]$ of the range map $R[k, m]$ may also be used as input data ($r_m[k]=R[k, m]$) instead of the signal segments $y_m[n]$. In this case, the signal processing structure corresponds to that from FIG. 10C. Since the range map $R[k, m]$, and thus also the spectra $r_m[k]$, have complex values, the real part and imaginary part may be filtered using separate neural networks.

Figure 14:
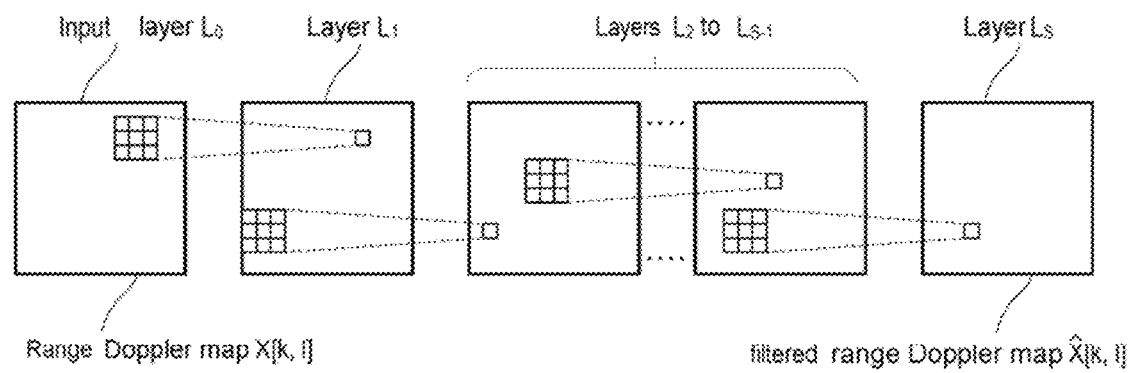
FIG. 14 illustrates a further example for filtering (denoising) a range map or a range Doppler map by way of convolutional neural networks (CNNs).

According to a further example, the filtering (denoising) is performed on the basis of the range Doppler map using a convolutional neural network (CNN), wherein a two-dimensional kernel (having for example 3×3 elements) is used. In this case, the kernel is also referred to as a convolutional matrix or mask. FIG. 14 illustrates the filtering (denoising) of a range Doppler map $X[k, l]$, which may be considered to be a N×M-matrix (that is to say k=0, ..., N-1 and l=0, ..., M-1). The real part $Re\{X[k, l]\}$ and imaginary part $Im\{X[k, l]\}$ each form the input layers $L_0$ of a separate neural network, that is to say the real part and imaginary part are processed separately. FIG. 14 in this case essentially shows only the general principle of filtering by way of a convolutional neural network. An example implementation is explained in more detail further on with reference to FIG. 15.

The layers $L_1$ to $L_S$ of the two neural networks each contain N×M-neurons that contain the output values $L_S[k, l]$ (for k=0, ..., N-1, l=0, ..., M-1 and s=1, ..., S), wherein $L_0[k, l]=X[k, l]$. The output values $L_S[k, l]$ may be calculated in the same way as equation 7 as follows:

$$L_S[k,l]=\varphi(\Sigma_{k=-1}^{1}\Sigma_{i=-1}^{1}w_s[i,j]\cdot L_{S-1}[k-i,l-j]), \quad (8)$$

wherein the ReLU function may for example be used as activation function $\varphi(\cdot)$. The weights $w_s[i,j]$ contained in the kernel are determined by training the neural networks. In order to be able to completely calculate the convolution according to equation 8, the N×M-matrices $L_{S-1}[k, l]$ are expanded for example by way of zero padding, such that $L_{S-1}[k, l]$ are also defined for k<0 and k≥N as well as l<0 and k≥M.

In one example implementation, the values of the input layer $L_0[k, l]$ may be normalized, such that for example the average is zero and the standard deviation is one. Such normalization of the values contained in the N×M-matrix $L_0[k, l]$ may be achieved through offset compensation (such that the average is zero) and scaling (such that the standard deviation is one). That is to say, in this case the values of the input layer $L_0[k, l]$ are equal to $a \cdot (Re\{X[k, l]\} - \overline{Re\{X\}})$, wherein a is the scaling factor and $\overline{Re\{X\}}$ is the average of the real parts of the range Doppler map. The imaginary part $Im\{X[k, l]\}$ may be normalized in the same way. Other types of normalization may likewise be used (for example in the interval from 0 to 1).

In the various layers of $L_1$ to $L_{S-1}$ of the neural networks, what is known as batch normalization may however be performed on the result of the convolution operation before applying the activation function $\varphi(\cdot)$. In this case, it is likewise attempted to bring the average of the output values of a layer (which are then the input values of the next layer) to zero and their standard deviation to 1. Performing batch normalization improves the stability of neural networks and may for example be taken from the publication S. Ioffe, C. Szegedy, *Batch Normalization: Accelerating Deep Network Training by Reducing Internal Covariale Shift*", arXiv: 1502.03167v3 [cs.LG], Mar. 2, 2015.

Depending on the actual implementation, the number of layers used in the neural networks may be different. Acceptable results may be achieved in many cases with four to ten layers. In one experiment, the performance of the denoising dropped with fewer than six layers and increased considerably with more than six layers. Good results were able to be achieved using kernels of dimension 3×3 and 5×5, provided that enough (for example more than six) layers are provided in the neural network. In the case of larger kernels (for example 7×7 elements), there is the risk of the form and the extent of the detected local maxima (peaks) in the filtered range Doppler map being blurred, which may impair the quality of the detection of radar targets. Larger kernels may however be used depending on the specification of the radar system.

In the example according to FIG. 14, a range Doppler map is filtered in its entirety. As an alternative, the denoising may also be performed based on the range map. In this example, the M spectra contained in a range map $R[k, m]$ are processed separately (and the real and imaginary part again separately). In this case, the input data are M×1-vectors and the kernel may have for example 25×1 elements. The convolution operation is in this case a one-dimensional operation, as already discussed above with reference to FIG. 12 (see also equation 7).

In the example from FIG. 14, the range Doppler map X[k, l] forms the input layer $L_0$ of the neural network. The range Doppler map X[k, l] typically contains N×M complex numerical values, which are the result of a two-dimensional FFT (cf. FIG. 9). The parameter M in this case denotes the number of frequency bins on the Doppler axis, and the parameter N denotes the number of frequency bins on the range axis (cf. explanations regarding FIG. 9). In the following example, the real part Re{X[k, l]} and imaginary part Im{X[k, l]} of the range Doppler map X[k, l] under consideration are considered to be separate "NN channels" (NN stands for neural network). That is to say, the input layer $L_0$ of the neural network has two NN channels, which are sometimes also referred to as "maps" (not to be confused with the range Doppler map). The output layer $L_S$ of the neural network likewise has two NN channels that represent the real part Re{X̂[k, l]} and imaginary part Im{X̂[k, l]} of the filtered range Doppler map X̂[k, l], in which noise and (for example interference-induced) disturbances are reduced (ideally eliminated). The other layers $L_1$ to $L_{S-1}$ may likewise have two or more NN channels. In the example from FIG. 15, in each case sixteen NN channels are used in the layers $L_1$ to $L_{S-1}$. The number of NN channels in the layers $L_1$ to $L_{S-1}$ is however not necessarily the same. The layers $L_1$ to $L_S$ are also referred to as convolutional layers. The NN channels of the individual layers of a neural network are not to be confused with the TX and RX channels of the RF front end of the radar system.

Figure 15:
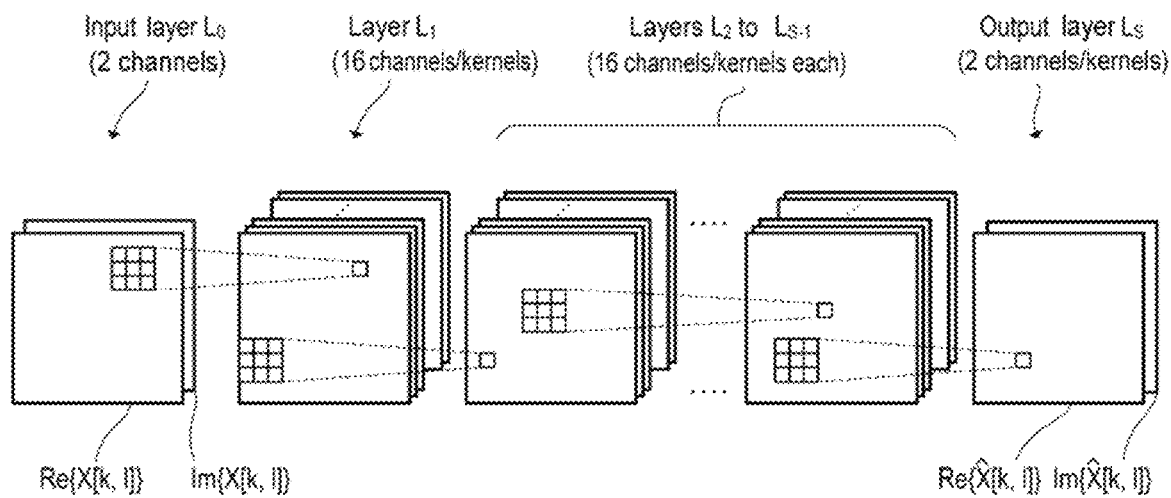
FIG. 15 illustrates an example implementation of the concept from FIG. 14 in more detail.

In the example from FIG. 15, the layer $L_1$ processes the output values of the two NN channels of the layer $L_0$ as input data. The output values of the sixteen NN channels of the layers $L_1$ to $L_{S-1}$ form the input values of the respective following layer $L_2$ to $L_S$. A kernel associated with the respective NN channel and that contains weighting factors as explained above is used in each layer $L_1$ to $L_S$ to calculate the output values of each NN channel. In the example from FIG. 15, in each case sixteen kernels are therefore used in the layers $L_1$ to $L_{S-1}$ (one kernel for each NN channel), whereas only two kernels are used in the layer $L_S$ (likewise one for each NN channel). The kernels are however not two-dimensional convolutional matrices, but rather three-dimensional arrays each containing $K_1 \times K_2 \times C_{in}$ elements. In this case, $K_1 \times K_2$ denotes the dimension of a kernel within an NN channel and $C_{in}$ denotes the number of NN channels that deliver input data. In the example illustrated in FIG. 15, the sixteen kernels of the layer $L_1$ have a dimension of 3×3×2, the sixteen kernels of the layers $L_1$ to $L_{S-1}$ have a dimension of 3×3×16, and the two kernels of the output layer $L_S$ likewise have a dimension of 3×3×16. It is understood that the numerical values that are given are merely examples. The values $K_1$ and $K_2$ are also not necessarily the same.

In the case of a plurality of NN channels, the convolution may take place in the same way as equation 8, wherein summing is additionally performed over all of the NN channels of the previous layer.

$$L_S[k,l,c]=\varphi(\Sigma_{u=1}^{C_{in}}\Sigma_{j=-1}^{1}\Sigma_{i=-1}^{1}w_s[i,j,u]\cdot L_{S-1}[k-i,l-j,c-u]). \quad (9)$$

In above equation 9, $L_S[k, l, c]$ denotes the output values of the cth NN channel of the sth layer. Equation 9 is a generalization of equation 8, wherein the sum of u=1 to $C_{in}$ denotes the summing over all of the $C_{in}$ NN channels of the respective previous layer. For the layer $L_1$, $C_{in}$ would be equal to two (the input layer $L_0$ has two NN channels), for the layers $L_1$ to $L_S$, $C_{in}$ would be equal to sixteen in the example from FIG. 15. As mentioned, equation 9 represents the special case in which the kernels $w_s[k, l, c]$ have $3 \times 3 \times C_{in}$ elements. In other examples, more than three elements may also be used in the first two dimensions (range and Doppler dimension).

Unlike in known applications (for example in image processing in order to classify objects contained in images), the neural network in the examples described here does not necessarily end with a fully connected layer, but rather with a "normal" convolutional layer. The output layer $L_S$, unlike the layers $L_1$ to $L_{S-1}$, may use a linear activation function $\varphi(\bullet)$, for example $\varphi(a)=a$ (for any argument a). Due to the fact that precisely two kernels are used in the output layer $L_S$, two output channels each having N×M values that represent the real part and imaginary part of a filtered range Doppler map are obtained.

Unlike in known applications, such as for example in image processing in order to classify objects contained in images, pooling is not necessarily performed in the example implementations described here. Pooling generally leads to a lossy reduction in the amount of data, which may generally be undesired in radar applications. The number of output values of each NN channel of each layer is generally N×M in the example implementations described here and therefore corresponds to the number of (complex) values of the range Doppler map.

Figure 16:
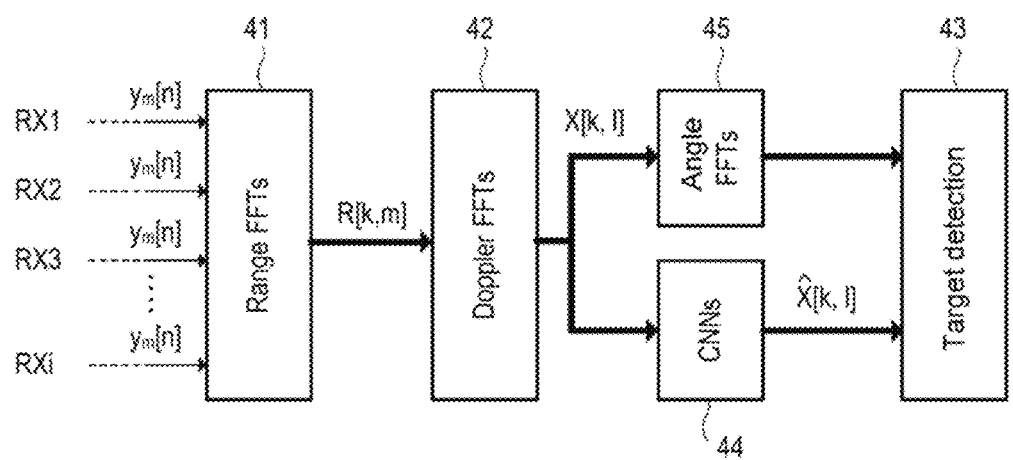
FIG. 16 illustrates, by way of example, a signal processing structure having a convolutional neural network (CNN) for filtering the range Doppler maps of a radar system and the subsequent target detection.

FIG. 16 illustrates one example of a signal processing structure within which denoising of the range Doppler maps is performed. In the illustrated example, consideration is given to a radar system with i RX channels RX1, RX2, . . . , RXi. The RX channels may also be virtual channels, that is to say channels in which each channel is in each case associated with a particular combination of transmission and reception antenna, for example in an MIMO arrangement. Each channel delivers a digital radar signal y[n] that is processed in segments, wherein each signal segment l $y_m[n]$ may be associated with a particular chirp of an emitted RF chirp sequence. In a first step, a range FFT is calculated for each channel (functional block 41), such that a range map R[k, m] is obtained for each channel (see also FIG. 9). In a second step, a Doppler FFT is calculated for each channel (functional block 42), such that a range Doppler map X[k, l] is obtained for each channel. The range Doppler maps are fed (sequentially or at least partly in parallel) to neural networks (functional block 44), wherein the real and imaginary part are each processed separately. The neural networks may be convolutional neural networks, as described above with reference to FIG. 14. The functional block 44 delivers a filtered range Doppler map X̂[k, l] for each channel as output data. In order also to be able to determine the direction of arrival (DoA) of the RF radar signals, angle FFTs are also calculated based on the unfiltered range Doppler map X[k, l] in a manner known per se. The target detection (functional block 43) is then performed based on the filtered range Doppler maps X̂[k, l]. As an alternative, the angle FFTs may also be calculated on the basis of the filtered range Doppler maps X̂[k, l].

Calculating the angle FFTs on the basis of the unfiltered range Doppler maps X[k, l] may however offer the advantage that, although the position and speed may still be determined on the basis of the filtered range Doppler maps X̂[k, l] (which significantly increases reliability and accuracy), the unfiltered data are used when determining the direction of arrival (DoA), such that any damage/change in the phases of the values contained in the range Doppler maps X[k, l] caused by the neural network has no influence.

The training data for training the neural networks may be determined for example by way of simulation. That is to say, digital radar data that are overlaid with noise and interfering signals (interference) are generated by way of a signal model using simulation software that is executed for example on a computer. These data determined by way of simulation are fed to the neural networks and the resulting output data may be compared with the "ideal" radar data (without noise and interference). The weight factors in the kernels are adapted during training of the neural networks such that the deviations of the filtered radar data from the ideal data are as small as possible. The deviation may be evaluated for example by way of the least squares method. This evaluation function is usually referred to as object loss function. Training neural networks is known per se and is therefore not explained in more detail here. By way of example, the neural network may be trained by way of the ADAM algorithm that is known per se.

Some of the example implementations described here are summarized below, it being pointed out that the summary below is not complete, but rather merely an example summary. One example implementation relates to a radar device with a radar transmitter and a radar receiver that may be arranged in one or in different radar chips (cf. FIG. 5). The radar transmitter is designed to output an RF transmission signal that comprises a plurality of frequency-modulated chirps (also referred to as frequency-modulated pulses) (see FIG. 6). The radar receiver is designed to receive an RF radar signal (see FIG. 9, graph (a)) and, based thereon, to generate a dataset (for example a range Doppler matrix, see FIG. 9, diagram (c)) in each case containing a particular number of digital values, wherein a dataset may be associated with a chirp or a sequence of successive chirps. The radar device furthermore comprises a neural network to which the dataset is fed and that is designed to filter the dataset in order to reduce an interfering signal contained therein (see for example FIGS. 10A-10D, 15, and 16). According to one example implementation, the neural network may be a convolutional neural network.

In one example implementation, the radar receiver is designed, based on the RF radar signal, to generate a digital radar signal in the time domain that comprises a plurality of signal segments that may be associated with a sequence of frequency-modulated chirps (see FIG. 9, graphs (b) and (c)). The signal segments form a radar data array, and the dataset is formed through two-dimensional Fourier transformation of the radar data array. The result of the two-dimensional Fourier transformation is usually referred to as a range Doppler map.

In those example implementations in which the dataset of digital values has been determined by way of Fourier transformation, the digital values of the dataset are complex values that each have a real part and an imaginary part (that is to say each complex value may be represented by a pair of real values). The neural network has an input layer with two NN channels (see for example FIG. 15). A first channel of the two NN channels delivers the real parts of the complex values of the dataset (for example of the range Doppler map) as output values, and a second channel of the two NN channels delivers the imaginary parts of the complex values of the dataset as output values. The output values of the two NN channels of the input layer are the input values of the following layer. The further layers (see for example FIG. 15, layers $L_1$ to $L_S$) of the neural network may each have two or more NN channels.

In one example implementation, the last layer (output layer) has precisely two NN channels, whereas the rest of the further layers have more than two NN channels (sixteen NN channels in the example from FIG. 15). A first NN channel of the output layer delivers the real parts as output values and a second NN channel of the output layer delivers the imaginary parts of complex values of a filtered dataset in which interfering signal components are reduced. In the example from FIG. 15, this filtered dataset represents the filtered range Doppler map $\tilde{X}[k, l]$. Each NN channel of each further layer (following the input layer) of the neural network delivers a number of real output values (cf. equation 9, output values $L_S[k, l, c]$) that corresponds to the number of complex values of the dataset. That is to say, the output values of each NN channel may be considered to be an N×M matrix/data array, wherein N×M also corresponds to the size of the range Doppler map.

In the example implementations described here, each layer of the neural network receives the output values of the NN channels of the respective previous layer as input values. The layers of the neural network are referred to as convolutional layers, wherein a convolution kernel is in each case associated with the NN channels of the further layers. That is to say, a convolutional layer with sixteen NN channels also uses sixteen convolution kernels. In this example, the output values of an NN channel of each of the further layers depend on a weighted sum of the input values that are fed to the respective layer. Which and how many of the input values are incorporated into the weighted sum depends on the respective convolution kernel.

A further example implementation relates to a method for a radar device, which method comprises the following: transmitting an RF transmission signal that comprises a plurality of frequency-modulated chirps (see FIG. 1, FIG. 2 and FIG. 6), and receiving an RF radar signal and generating a dataset containing in each case a particular number of digital values based on the received RF radar signal. A dataset may be associated with a chirp or a sequence of successive chirps. The method furthermore comprises filtering the dataset by way of a neural network to which the dataset is fed in order to reduce an interfering signal contained therein (see for example FIGS. 10A-10D, FIG. 15 and FIG. 16). According to the example implementations described here, the neural network may be a convolutional neural network. The features mentioned above with reference to the radar device also of course relate to the method.

What is claimed is:

1. A radar device, comprising:
   a radar receiver that is designed to receive a radio-frequency (RF) radar signal associated with a plurality of frequency modulated chirps and, based thereon, to generate a digital signal that comprises a plurality of signal segments; and
   a neural network having a plurality of layers each having one or more neurons,
      wherein the plurality of signal segments are fed to an input layer of the plurality of layers and wherein the plurality of layers are designed to process the plurality of signal segments of the digital signal,
      wherein an output layer of the plurality of layers, has at least one neuron that delivers an output value that indicates whether a respective signal segment or a sample of the respective signal segment is overlaid with an interfering signal originating from at least one radar transmitter of at least one other radar device, wherein a convolutional kernel is associated with one or more neural network (NN) channels of one or more other layers of the plurality of layers, and wherein the one or more other layers receive as input, output values of the one or more NN channels of a previous layer.

2. The radar device as claimed in claim 1, further comprising:

a radar transmitter that is designed to generate an RF transmission signal that comprises a plurality of frequency-modulated pulses, wherein each of the plurality of signal segments of the digital signal is associated with a respective frequency-modulated pulse of the plurality of frequency-modulated pulses, and wherein the plurality of signal segments are in a time domain or in a frequency domain.

3. The radar device as claimed in claim 1, wherein the output layer of the neural network is designed to deliver an output value that indicates whether the respective signal segment is overlaid with a frequency-modulated interfering signal from an external frequency-modulated radar transmitter.

4. The radar device as claimed in claim 1, wherein the output layer has a neuron that indicates whether one or more of the plurality of signal segments fed to the input layer contains an interfering signal.

5. The radar device as claimed in claim 1, further comprising:

a computing unit that is designed to detect a radar target based on the digital signal, wherein one or more of the plurality of signal segments for which the at least one neuron of the output layer of the neural network indicates overlaying of an interfering signal remain unconsidered.

6. The radar device as claimed in claim 1, wherein the output layer has a plurality of neurons that are each associated with a sample of the respective signal segment and wherein each of the plurality of neurons indicates whether the sample associated therewith contains an interfering signal.

7. The radar device of claim 1, wherein the output values of the one or more NN channels of the one or more other layers are based on a weighted sum of input that is provided to the respective layer, and wherein the input that is provided to the respective layer is based on a respective convolution kernel.

8. A radar device, comprising:

a radar transmitter that is designed to output a radio-frequency (RF) transmission signal that comprises a plurality of frequency-modulated chirps;

a radar receiver that is designed to receive an RF radar signal associated with a plurality of frequency modulated chirps and, based thereon, to generate a dataset containing a particular number of digital values, wherein a dataset is associated with a chirp or a sequence of successive chirps; and a neural network to which the dataset is fed and that is designed to filter the dataset in order to reduce an interfering signal originating from at least one radar transmitter of at least one other radar device contained therein, wherein the neural network is a convolutional neural network with a plurality of layers, wherein a convolutional kernel is associated with one or more neural network (NN) channels of a plurality of further layers of the plurality of layers, and wherein the plurality of further layers receive as input, output values of the one or more NN channels of a previous layer.

9. The radar device as claimed in claim 8, wherein the radar receiver is designed, based on the RF radar signal, to generate a digital radar signal in a time domain that comprises a plurality of signal segments that are associated with a sequence of frequency-modulated chirps, and wherein the plurality of signal segments represent a radar data array and the dataset is formed through two-dimensional Fourier transformation of the radar data array.

10. The radar device as claimed in claim 8, wherein the radar device is designed, based on the RF radar signal, to generate a digital radar signal in a time domain that comprises a plurality of signal segments that are associated with a sequence of frequency-modulated chirps, and based on the digital radar signal, to calculate a range Doppler map that forms the dataset of digital values.

11. The radar device as claimed in claim 10, wherein the dataset of digital values represents a dataset of complex values;

wherein the convolutional neural network has an input layer with two NN channels, wherein a first channel of the two NN channels is to deliver real parts of the complex values of the dataset as output values, and wherein a second channel of the two NN channels is to deliver imaginary parts of the complex values of the dataset as output values.

12. The radar device as claimed in claim 11, wherein each of the plurality of further layers is associated with two or more NN channels.

13. The radar device as claimed in claim 12, wherein a last layer of the plurality of further layers forms an output layer that has two NN channels, and wherein a first channel of the two NN channels of the output layer is to deliver real parts as output values and a second channel of the two NN channels of the output layer is to deliver imaginary parts of complex values of a filtered dataset in which interfering signal components are reduced as output values.

14. The radar device as claimed in claim 13, wherein the output layer has precisely two NN channels and each of the rest of the plurality of further layers has more than two NN channels.

15. The radar device as claimed in claim 12, wherein each NN channel of each of the plurality of further layers of the neural network is to deliver a number of real output values that corresponds to a number of complex values of the dataset.

16. The radar device as claimed in claim 8, wherein output values of an NN channel of each respective layer of the plurality of further layers depends on a weighted sum of input values that are fed to the respective layer.

17. A method for a radar device, comprising:

transmitting a radio-frequency (RF) transmission signal that comprises a plurality of frequency-modulated chirps;

receiving an RF radar signal associated with a plurality of frequency modulated chirps, and generating a dataset containing a particular number of digital values based on the RF radar signal, wherein a dataset is associated with a chirp or a sequence of successive chirps; and filtering the dataset using a neural network to which the dataset is fed in order to reduce an interfering signal originating from at least one radar transmitter of at least one other radar device contained therein, wherein the neural network is a convolutional neural network with a plurality of layers, wherein a convolutional kernel is associated with one or more neural network (NN) channels of one or more other layers of the plurality of layers, and wherein the one or more other layers receive as input, output values of the NN channels of a previous layer.

18. The method as claimed in claim 17, wherein generating the dataset comprises:

generating a digital radar signal in a time domain based on the RF radar signal, wherein the digital radar signal comprises a plurality of signal segments that are associated with a sequence of frequency-modulated chirps, wherein the plurality of signal segments represent a radar data array; and forming the dataset through two-dimensional Fourier transformation of the radar data array.

19. The method as claimed in claim 18, wherein the dataset of digital values is a dataset of complex values;

wherein the neural network has an input layer with two NN channels, wherein a first channel of the two NN channels delivers real parts of the complex values of the dataset as output values, and wherein a second channel of the two NN channels delivers imaginary parts of the complex values of the dataset as output values.

20. The method as claimed in claim 17, wherein an output layer of the plurality of layers has at least one neuron that delivers an output value that indicates whether a respective signal segment or a sample, associated with the neuron, of the respective signal segment is overlaid with an interfering signal.

\* \* \* \* \*